US011470869B2

(12) United States Patent
Lu

(10) Patent No.: US 11,470,869 B2
(45) Date of Patent: Oct. 18, 2022

(54) FOOD PRODUCT, INCLUDING BOBA (BUBBLE, PEARL) BEVERAGE REPLACING TAPIOCA WITH CHIA SEED AS THE MAIN INGREDIENT

(71) Applicant: Wenching Grace Lu, Missouri City, TX (US)

(72) Inventor: Wenching Grace Lu, Missouri City, TX (US)

(73) Assignees: Wenching Grace Lu, Missouri City, TX (US); Brian George Lu, Missouri City, TX (US)

( * ) Notice: Subject to any disclaimer, the term of this patent is extended or adjusted under 35 U.S.C. 154(b) by 0 days.

(21) Appl. No.: 16/905,638

(22) Filed: Jun. 18, 2020

(65) Prior Publication Data

US 2020/0315226 A1 Oct. 8, 2020

Related U.S. Application Data

(63) Continuation-in-part of application No. 15/660,849, filed on Jul. 26, 2017, now abandoned.

(51) Int. Cl.
| | |
|---|---|
| A23L 25/00 | (2016.01) |
| A23L 2/02 | (2006.01) |
| A23L 9/10 | (2016.01) |
| A23F 5/14 | (2006.01) |
| A23L 2/56 | (2006.01) |
| A23F 5/46 | (2006.01) |
| A23L 5/10 | (2016.01) |

(52) U.S. Cl.
CPC ............... *A23L 25/00* (2016.08); *A23F 5/14* (2013.01); *A23F 5/465* (2013.01); *A23L 2/02* (2013.01); *A23L 2/56* (2013.01); *A23L 5/13* (2016.08); *A23L 9/10* (2016.08)

(58) Field of Classification Search
CPC ..................................................... A61K 35/78
USPC ........ 426/590, 573, 579, 524, 100; 424/746, 424/750
See application file for complete search history.

(56) References Cited

U.S. PATENT DOCUMENTS

| | | | | |
|---|---|---|---|---|
| 2,508,533 A * | 5/1950 | Olsen | ....................... | C08B 30/14 127/32 |
| 7,115,297 B2 * | 10/2006 | Stillman | ................... | A23L 2/38 426/590 |
| 7,615,245 B2 * | 11/2009 | Sweeney | .................. | A23G 9/44 426/580 |
| 8,652,544 B2 * | 2/2014 | Minatelli | .................. | A61P 1/00 424/746 |
| 9,161,960 B2 * | 10/2015 | Minatelli | .................. | A23G 3/48 |
| 2001/0002269 A1 * | 5/2001 | Zhao | ......................... | A23F 5/44 426/112 |
| 2002/0155182 A1 * | 10/2002 | Belna | ..................... | A23L 33/105 424/746 |
| 2004/0009286 A1 * | 1/2004 | Tsou | ....................... | A23P 10/22 426/615 |
| 2007/0098851 A1 * | 5/2007 | Williams | ............. | A47G 21/183 426/85 |
| 2009/0181114 A1 * | 7/2009 | Minatelli | .................. | A23L 2/02 424/746 |
| 2014/0057021 A1 * | 2/2014 | Da Silva | .................... | A23L 2/38 426/72 |
| 2014/0057038 A1 * | 2/2014 | Da Silva | .................... | A23L 2/46 426/548 |
| 2015/0064310 A1 * | 3/2015 | Thompson | ................ | A23L 2/52 426/63 |
| 2016/0000131 A1 * | 1/2016 | Vescovi | ..................... | A23L 2/39 426/2 |
| 2018/0020698 A1 * | 1/2018 | Zhu | .......................... | A23L 27/72 426/599 |
| 2019/0029298 A1 * | 1/2019 | Lu | .............................. | A23L 2/02 |

FOREIGN PATENT DOCUMENTS

CN 105558734 * 5/2016 ............. A23L 33/00

OTHER PUBLICATIONS

Soaked Chia Seeds, Recipe and Video Martha Stewart. (Year: 2015).*
www.chefdehome.com—Strawberry Chia Frozen yogurt. May 9, 2014 (Year: 2014).*
Chocolate Rooibos Chia Seed Bubble Tea Recipe—Jeanette's Helathy Living, May 22, 2014 (Year: 2014).*
Joanna Soh, YouTube https://www.youtube.com/watch?v=p7HvNeEJ-EY, Apr. 29, 2016 (Year: 2016).*

* cited by examiner

*Primary Examiner* — Nina Bhat
(74) *Attorney, Agent, or Firm* — McKee, Voorhees & Sease, PLC

(57) ABSTRACT

A food product prepared by soaking a predetermined quantity of chia seeds in liquid under a dark environment and under a temperature in a range of 32 degrees Fahrenheit to 40 degrees Fahrenheit for a predetermined period to obtain pearls of chia seeds; and adding the pearls of chia seeds to a food product. The food product can be Boba drink without tapioca starch.

5 Claims, No Drawings

FOOD PRODUCT, INCLUDING BOBA (BUBBLE, PEARL) BEVERAGE REPLACING TAPIOCA WITH CHIA SEED AS THE MAIN INGREDIENT

CROSS-REFERENCE TO RELATED APPLICATIONS

This application is a continuation in Part of U.S. patent application Ser. No. 15/660,849, filed on Jul. 26, 2017, which is hereby incorporated by reference in their entirety.

FIELD OF INVENTION

The present invention relates to a food product and in particular to a food product having enhanced nutritional value.

BACKGROUND

Food is essential for living beings. It provides both energy and nutrition for growth. Every living being requires food, the forms of food can be different for different living beings. Humans, like other living beings also depend upon food to sustain life. Also, it is essential that humans eat a variety of foods to provide a diverse nutritional requirement of the body. Food products rich in nutrition, such as minerals, vitamins, essential proteins, and fatty acids are considered healthier. Consumption of healthier food provides the building blocks to the body essential for sustaining life and growth.

Bubble tea was a popular beverage that contains translucent spheres produced from tapioca. Tapioca is a starch extracted from the cassava root. The various forms of tapioca balls include the original black, flavored, popping, mini, and clear. By adding different ingredients, like water, sugar, and seasoning, tapioca balls can be made to vary in color and in texture. The most common, and original, tapioca balls are usually soaked in a simple sugar syrup to give it a little bit of sweetness while keeping it fresh. They typically lack flavor and gel easily and are therefore often used as a thickening agent in foods like pudding. The tapioca pearls are simply there to provide texture, the flavor really comes from the drink itself. Despite being a popular drink, the Bubble tea lacks nutritional value.

Thus, a need is always appreciated to make the food products healthier.

SUMMARY OF THE INVENTION

The principal object of the present invention is therefore directed to a food product that is rich in nutrition.

It is a further object of the present invention that the nutrition includes essential fatty acids, proteins, minerals, and vitamins.

It is a still further object of the present invention that the food product is delicious.

It is another object of the present invention that the food product is devoid of toxic and cheap raw materials.

It is still another object of the present invention that the food product is devoid of processed synthetic or semi-synthetic raw materials.

It is a further object of the present invention that the food product is having natural ingredients.

It is another object of the present invention that the food product is economical to prepare.

These and other objects and advantages of the embodiments herein will become readily apparent from the following detailed description taken in conjunction with the accompanying drawings.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The present invention is directed to a food product that is healthier and more delicious. The present invention is directed to a food product having chia seeds. In one embodiment, the chia seeds can be added to the food product in pearl form. To prepare the pearl form of chia seeds, soak the chia seed for a predetermined period, resulting in the absorption of liquid by the, chia seeds. The chia seed swells to a jell like consistency when soaked into a sufficient amount of water for a good amount of time. The chia seed in jelly forms is referred to hereinafter as the pearls of chia seeds. The pearls of chia seeds can be added to a food product. The food product with chia seeds can be served as such or the food product can be mixed with the food product resulting in the thickening of the food product.

In one case, the food product commercially available as bubble tea. Also, popularly known as pearl milk tea, bubble milk tea, and Boba, is a Taiwan based beverage containing tea, milk, or flavors of milk, and optionally sugar. Also, the beverage can additionally comprise fruit jelly, grass jelly, agar jelly, aloe Vera jelly, sago, and puddings. The bubble tea can be served hot and cold. Ice-blended versions are frozen and put into a blender, resulting in a slushy consistency. The bubble tea, according to the present invention can be prepared by addition chia seeds in the pearl form. The chia seeds can be soaked in water or milk. The adding of chia seeds pearls to the bubble tea increases the consistency of the bubble tea and also makes the bubble tea chewier.

Chia seeds as a natural ingredient are high in fiber, providing Vitamin D, Calcium, Iron, Potassium, antioxidants, and an excellent source of Omega 3. Chia seeds are easy to be digested, and do not need to be ground or milled to release their nutritional benefits. As a natural ingredient, Chia seed is a source of dietary protein providing essential amino acids. The unsaturated fatty acids in Chia seeds are essential oils the body needs to help emulsified an absorb the fat-soluble vitamins A, and D, E, and K.

Chia seeds do not need to be cooked separately. One quality of Chia seeds is its ability to absorb nearly twelve times its weight in water. Chia seeds contain water-soluble fiber that when wet, produces a gel. In one embodiment, the Chia seeds can be added directly to a beverage. In one case, simply mix Chia seeds with milk tea for a couple of hours. Therefore; Chia milk tea is easy to be prepared.

In one embodiment, mix couple teaspoons of Chia seeds with milk tea, chilled overnight or couple hours (depend upon quantity) before serving. For 8 Oz size cup, 3 teaspoons of Chia seeds chilled with milk tea for three hours are good for serving. Mix fewer teaspoons to have more liquid-like drinks. Mix more teaspoons to have more jellylike drink or pudding form. The beverages can be customized in diverse ways having a range of consistencies.

Chia seed can be a healthier alternative to the tapioca currently used in beverages and other food products. Traditional bubble tea also includes tapioca in a jelling agent. Also, the tapioca is widely marketed as an additive, in particular, as a thickening agent for food products. Chia seeds have an additional advantage over tapioca that the chia seeds can be soaked, unlike tapioca which has to be boiled. Thus, nutrition in the chia seeds is not destroyed due to boiling.

In one embodiment, the food product is a beverage to which the chia seed pearls can be added. In one case, chia seeds pearls can be added to the beverage just before the consumption of the beverage. The beverage can include ingredients like sweeteners and flavoring agents. In one case, honey, chocolate, coffee, mint, etc. can be added to the beverage. In one case, the beverage is a bubble tea having sugar in place of honey. In one case, any suitable sweetener can be used including honey, sugar, Saccharin, sucrose, Stevia, and like. The type and quantity of sugar can be added based on the preference of the customers.

In one embodiment, the chia seed can be soaked in water, milk tea, or a beverage for at least 5 minutes to form pearls of chia seeds. In one case, the chia seed can be soaked in water and honey. In one case, the pearls can be added to bubble tea replacing the tapioca. In one case, the pearls can be added to coffee, the coffee can be a hot coffee, cold coffee, or a cold brew coffee.

In one preferred embodiment, the chia seeds are soaked in a liquid under dark conditions. This preserves some of the essential nutrients of the chia seeds. The pearls of the chia seed stored under dark conditions can be added to a beverage or food product before consumption. In one case, chia seeds are soaked with 12 times its weight of liquid under dark and refrigeration conditions for 3 hours. For example, 3 teaspoons of chia seeds can be soaked in 8 Oz liquid. The pearls of chia seeds formed can be then mixed with a beverage including the bubble tea. Perhaps the present invention provides an optimum range of temperature for preparing the pearls of chia seeds. It was discovered by the inventor that soaking chia seeds in dark environment at a temperature below 40 degrees Fahrenheit but above the freezing point result in the enhancement of the nutritional value of the pearls of chia seeds. Water generally freezes at a temperature below 32 degrees Fahrenheit. Thus, the present invention provides for soaking the chia seeds in a temperature range of 32-40 degrees Fahrenheit.

The chia seed can be soaked in a liquid which is preferably water. The liquid can also be milk. In case, the liquid is water, the water can include flavoring agents and coloring agents. The flavoring agents and coloring agents known for use in food products are within the scope of the present invention.

In one case, chia seed can be soaked in a liquid of volume 2-4 times the weight of chia seed. The pearls form by such as method results in the formation of pudding-like consistency of the beverage.

In one case, the food product can be an ice cream shakes; slushy smoothies; crushed-fruit juices; puddings; tea type beverages, including green tea, black tea, white tea, Thai tea; coffee; mocha; chocolate-based beverages; milk including soya milk. The beverage can include sweeteners such as sucrose, honey, aspartame, and stevia. Flavors, such as agaves, vanilla extract, and fruit flavors can be added. In one case, crushed fruit juices can include juices of peach, plum, strawberry, apple, passion fruit, mango, lemon, watermelon, grape, lynches, pineapple, cantaloupe, honeydew, banana, avocado, coconut, kiwi fruit, jack fruit, taro, pomegranate, orange, blueberry. In one case, the food product can be yogurt, egg pudding. In one case, to the beverage can be added barley, sesame, almond, ginger, lavender, rose, caramel, violet, hibiscus flowers, mung bean, sago, yogurt, lime, cherry, guava.

In one case, bubble tea is a preferred beverage according to the present invention and can include many varieties of flavor with ingredients including green tea, black tea, white tea, Thai tea, coffee, mocha, chocolate, milk, soy milk, syrup, honey, sugar, agaves, aspartame, vanilla extract, jelly, fruit, peach, plum, strawberry, apple, passion fruit, mango, lemon, watermelon, grape, lynches, pineapple, cantaloupe, honeydew, banana, avocado, coconut, kiwifruit, jackfruit, taro, barley, sesame, almond, ginger, lavender, rose, caramel, violet, hibiscus flowers, mung bean, egg pudding, sago, pomegranate, orange, blueberry, yogurt, lime, cherry, guava.

What is claimed is:

1. A method of making of making a chia seed bubble product wherein said product is free of tapioca balls or milled tapioca starch comprising the steps of:
    soaking a predetermined amount of chia seed in an amount of liquid and flavoring agent which is 1-12 times the mass of the chia seed in a cool or refrigerated environment for at least 5 minutes to at least 3 hours forming a chia seed pearl form or gel soaked chia seed base;
    mixing said soaked chia seed base with additional liquids and flavoring agents;
    wherein the liquid is selected from the group consisting of tea, coffee, milk products, non-dairy milk products, yogurt, fruit juices, water and mixtures thereof.

2. The method of claim 1, wherein the flavoring agents are selected from the group consisting of honey, sweet syrup, sweeteners, cocoa products, seasonings, minerals, vitamins, jellies, edible flowers, fruit, fruit extracts and mixtures thereof.

3. The method of claim 1, wherein the amount of liquid and flavoring agents added to the soaked chia seeds is in an amount to provide a viscosity of a beverage product.

4. The method of claim 1, wherein the amount of liquid and flavoring agents added to the soaked chia seed base is in an amount to provide a viscosity of a pudding.

5. The method of claim 1, wherein the soaked chia seed base is mixed with additional liquids and flavoring agents which is further blended with ice to form a slushy chia seed bubble product.

\* \* \* \* \*